(12) United States Patent
Kohr et al.

(10) Patent No.: US 7,452,952 B2
(45) Date of Patent: Nov. 18, 2008

(54) METHOD OF APPLYING REMOVABLE COATING COMPOSITIONS

(75) Inventors: Alan Wayne Kohr, Schwenksville, PA (US); Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/633,360

(22) Filed: Dec. 4, 2006

(65) Prior Publication Data

US 2007/0098915 A1 May 3, 2007

Related U.S. Application Data

(62) Division of application No. 10/727,907, filed on Dec. 4, 2003, now Pat. No. 7,230,060.

(60) Provisional application No. 60/435,002, filed on Dec. 19, 2002.

(51) Int. Cl.
*C08F 220/46* (2006.01)
*C08J 3/28* (2006.01)

(52) U.S. Cl. .................... 526/317.1; 526/319; 526/309; 526/346; 526/347; 522/149; 522/150

(58) Field of Classification Search ............. 526/317.1, 526/319, 309, 346, 347; 522/149, 150
See application file for complete search history.

(56) References Cited

U.S. PATENT DOCUMENTS

| 5,306,744 | A | 4/1994 | Wolfersberger et al. |
| 5,574,090 | A | 11/1996 | Gray |
| 6,197,844 | B1 | 3/2001 | Hamrock et al. |
| 6,472,027 | B1 | 10/2002 | Olson |
| 6,558,795 | B2 * | 5/2003 | Olson et al. .................. 428/413 |

FOREIGN PATENT DOCUMENTS

| JP | 05263046 | 10/1993 |
| JP | 2002309127 | 10/2002 |
| WO | WO 98/11168 | 3/1998 |
| WO | WO 01/83878 A2 | 11/2001 |
| WO | WO 02/085991 A1 | 10/2002 |

* cited by examiner

*Primary Examiner*—Robert D. Harlan
(74) *Attorney, Agent, or Firm*—Carl P. Hemenway

(57) ABSTRACT

A method of applying coating composition is described in which the coating composition comprises a multi-stage emulsion polymer that is both radiation curable, removable and includes chemically reactive functional groups in the coating that react with one or more conventional chemical stripping agents, effecting the removal of the coating from a substrate. The UV curable and removable composition is included within one or more layers applied on top of a substrate or on top of a base coat that itself is disposed on top of a substrate.

19 Claims, No Drawings

METHOD OF APPLYING REMOVABLE COATING COMPOSITIONS

This Application is a Divisional of U.S. patent application Ser. No. 10/727,907, filed Dec. 4, 2003, now U.S. Pat. No. 7,230,060, which claims the benefit of U.S. Provisional Application 60/435,002 filed Dec. 19, 2002.

The present invention relates to curable compositions included in a protective coating or within one or more coating layers that can be readily removed after the coating is applied to a substrate. In particular, it is directed to a floor coating that is prepared via radiation curing of a polymer, a floor coating including chemically reactive polymers or polymers having chemically reactive functional groups triggered to release the coating from a substrate, a floor finish system including removable radiation cured compositions, a process for applying removable radiation cured coatings to a substrate, a subsequent process for chemically removing coatings from a substrate, a multifunctional polymer useful in the formulation of the removable radiation curable compositions and their method of preparation.

Conventional highly cross-linked coating compositions typically do not provide easily removable coatings using traditional stripping operations (for example, treatment with solvent and ammonia or amines). Highly cross-linked coatings are desirable because of enhanced durability characteristics (such as long wear and scuff resistance) and are typically based on two-component (reactive) systems or systems requiring external energy sources to induce cross-linking (UV, electron beam) such that the resultant coatings do not swell significantly when exposed to typical chemical swelling agents and the film integrity is not disrupted to a sufficient extent to allow ready removability from a substrate. It is desirable to provide floor coating compositions that are applied to a substrate (e.g vinyl flooring, concrete) which immediately dry and cure in air during a single application and which can readily be removed after the coating is applied to the substrate. In general, the coating and finishes cannot be easily removed from the flooring to which they are applied using conventional chemical stripping compositions in combination with a stripping pad or brush. Highly cross-linked UV cured polymer coatings and finishes applied to substrates such as concrete also cannot be removed using conventional chemical floor stripping techniques. Typically, the coatings are removed by abrasive processes including sanding, which can result in irreparable damage to the concrete surface.

U.S. Pat. No. 6,197,844 B1 discloses a curable coating composition comprising (a) poly (isocyanurate) oligomer having at least three terminal reactive isocyano functional groups that can be reacted with (b) hydroxy alkylacrylate and (c) tertiary amine alcohol in a molar ratio of a:b:c of about 1:1.1-2.5:0.5-2, wherein b+c is at least 3 and no greater than the total amount of terminal reactive groups of (a). Curable coatings prepared from poly(isocyanurate) compositions, however, suffer a number of limitations and present safety, health and environmental problems. The isocyano functional groups are chemically reactive and inherently toxic to the user of such compounds. The poly(isocyanurate) compositions are difficult to store for long periods of time; the isocyano functional groups readily react with water (i.e. in the form of moisture, humidity). The stripped materials are potentially harmful to users during handling and have a negative environmental impact on disposal. In addition, the stripped materials have separate toxicity issues associated with their handling and remediation. Problems are likely encountered with mixing the poly(isocyanurate) compositions with acrylic emulsion polymers, including incompatibility of the two components and the burden and inefficiency of additional steps. The poly(isocyanurate) material may have to be pre-emulsified before it can be added to the latex polymer. Improper pre-emulsification leads to defects in the final UV-cured coating. Other problems have been noted in the formulation of UV curable floor finish systems including an appearance of color in the hardened coating and/or an altered color of the coated substrate referred to as yellowing, noticeable odors of monomers during curing of the coating, and high levels of both photo-initiator and radiation source intensity required for producing the hardened coating.

Similarly, single-package cross-linkable coating formulations based on polyurethane type and other latent cross-linking mechanisms (such as multi-component systems) possess enhanced durability characteristics (scuff, mar or scratch resistance), but without the advantage of being readily removable upon demand. Due to their inherent lack of easy removability these highly durable coatings are typically limited in use to factory applied coatings and special end user markets, for example high performance wood floor coatings and industrial maintenance coatings.

It is desirable to provide coating compositions having the advantages of both the enhanced durability of highly cross-linked coatings and the easy removability of the conventional less durable, coating compositions. A long felt and still unsolved need exists to provide curable yet removable coatings suitable for use as a floor finish that are easily applied to a floor substrate or that are included within one or more coating layers on top of the substrate, that cure in air upon exposure to low intensity radiation without objectionable odors, that possess little or no toxicity during storage and handling by a user and that have minimal environmental impact when the cured coating is stripped and disposed of, that provide a protective coating(s) substantially free of observable color and that include highly cross-linked compositions that are easily removed from the floor by a suitable chemical stripping composition. The problem addressed by the present invention is to provide coating compositions having these combined advantages, previously unavailable in conventional coating compositions. Inventors have discovered that radiation curable emulsion polymer compositions including one or more multifunctional monomers in at least one stage of the polymer have significant utility as radiation cured yet removable coatings. Finishes including the removable radiation curable compositions can be cured rapidly when exposed to low intensity UV radiation to provide durable, protective coatings on a substrate. Functional groups in the coating can be chemically activated to effect the rapid removal of the coating when exposed to conventional chemical stripping agents.

Accordingly, there is provided a multifunctional polymer useful in the formulation of removable radiation curable compositions, the polymer comprising (a) a plurality ethylenically unsaturated groups and (b) a plurality of chemically reactive functional groups; that forms a highly cross-linked coating on a substrate or within one or more layers applied on top of a substrate; and wherein chemically reactive functional groups incorporated in the coating react with one or more chemical stripping agents effecting the removal of the coating from the substrate.

A coating composition is provided comprising an emulsion polymer that is both radiation curable, removable and includes chemically reactive functional groups in the coating that react with one or more chemical stripping agents, effecting the removal of the coating from a substrate. In one embodiment, the coating is applied directly to the substrate. In a separate embodiment, the coating includes an emulsion polymer that is both radiation curable, removable and incorporated within one or more layers applied on top of a substrate. In a separate embodiment, the coating includes an emulsion polymer that is both radiation curable, removable and is applied on top of a base coat.

Accordingly, there is provided a floor finishing system comprising a removable curable coating and a base coat composition, wherein the base coat further comprises a conventional coating composition that is in contact with a substrate and is removable from the substrate using one or more chemical stripping agents and wherein the removable curable coating is in contact with the base coat composition. In a separate embodiment there is provided a floor finishing system comprising a removable curable coating that is in contact with a substrate and is removable from the substrate using one or more chemical stripping agents.

There is also a provided a method for applying a highly cross-linked coating as one or more layers to a substrate and subsequently removing all coating layers from a substrate comprising the steps of:

(a) applying one or more layers of a coating comprising a curable, removable emulsion polymer;
(b) curing the composition to form a highly cross-linked coating over the substrate by exposing the composition to ultraviolet radiation; and
(c) removing all coating layers from the substrate by exposing the coating to one or more chemical stripping agents.

The present invention also provides a method for preparing a UV curable, removable multi-layer coating composition comprising (a) applying a first-coating composition to a substrate wherein the first-coating composition comprises a polymer product having a gel fraction of 0.3 to 0.95 in a solvent selected from one or more of acetone and tetrahydrofuran and wherein the first-coating composition is applied in one or more separate applications, allowing the first-coating composition to dry after each application; and (b) applying one or more layers of a coating comprising a curable, removable emulsion polymer.

The present invention further provides a coated surface composition comprising a substrate bearing a multi-layer coating comprising (a) a first-coating composition disposed upon the substrate, wherein the first coating composition comprises a polymer product having a gel fraction in acetone of 0.3 to 0.95; and (b) a second-coating composition disposed upon the first coating composition, wherein the second coating composition comprises a curable, removable emulsion polymer; wherein the substrate is selected from one or more of flooring, wall, ceiling and tile materials.

Conventional easily removable protective coatings in the form of polishes are typically intended as sacrificial coatings to protect an underlying substrate by accepting and resisting marks, soils, scuffs, abrasion and scratches encountered in the normal use of the substrate, and, when the useful or aesthetic life of the protective coating has expired, the polish can be easily removed from the substrate to be replaced with a new coating. Typically, removability has been provided for these floor polishes by (i) incorporating metal ion cross-linking agents into polymers containing an excess of free carboxyl groups such that the metal ion cross-linking agents react with residual carboxyl groups (for example, from polymerized acrylic or methacrylic acid) or by (ii) the use of high levels of acid containing Alkali Soluble Resins (ASR) as formulation adjuncts. The relative excess of free carboxyl groups allows these coating compositions to swell when exposed to chemical swelling agents (such as aqueous ammonia or amines), thus rendering the coating easily removable when exposed to the stripping process; the swelling phenomenon interferes with cohesion and adhesion of the coating to the substrate such that film integrity is disrupted, thus facilitating removal of the coating from the substrate, for example, hard surfaces such as flooring, ceiling, walls and tiles. However, if sufficient acid functionality is added to the polish polymer or polish formulation for adequate long-term removability, resistance or durability of the polish film to scrubbing with alkaline detergent solutions is significantly diminished. Alternatively, if the acid functionality in the polish polymer or the amount of ASR in the formulation is reduced in order to allow for aggressive cleaning operations, then long-term ease of removability is compromised. Inventors have discovered a new solution to providing highly durable coatings that are easily removed after application to a substrate. Inventors have discovered that highly cross-linked, UV cured coatings prepared from certain emulsion polymers have enhanced durability and are easily removed under conventional stripping conditions.

As used herein, the following terms have the designated definitions, unless the context clearly indicates otherwise. The term "alkyl (meth)acrylate" refers to either the corresponding acrylate or methacrylate ester; similarly, the term "(meth)acrylic" refers to either acrylic or methacrylic acid and the corresponding derivatives, such as esters or amides. The term "copolymer" refers to polymer compositions containing units of two or more different monomers. The term "radiation-curable" in reference to coating compositions, refers to coating compositions that form a hardened coating upon exposure to radiation such as UV radiation, visible light or electron beam. The terms "ultraviolet radiation" and "UV radiation" are used interchangeably to refer to the spectrum of light having wavelengths in the range from about 180 to 400 nanometers; visible light refers to the spectrum of light having wavelengths in the range from about 400 to 800 nanometers. The term "coating composition" refers to aqueous-based or solvent-based liquid compositions that can be applied to a substrate and thereafter solidified (for example, by radiation, air curing, post cross-linking or ambient temperature drying) to form a hardened coating on the substrate.

The term "substrate" refers to any surface (vertical, horizontal or inclined, such as flooring, walls, ceilings and stairways) upon which the coating compositions of the invention may be applied, and includes, for example, flooring, wall, ceiling and tile materials such as vinyl floor tiles (including tiles optionally coated with sealer or primer), ceramic tiles, wood, metal, concrete, marble, slate and simulated natural stone. Preferably the flooring, wall, ceiling and tile materials are selected from one or more of the group consisting of vinyl polymer, concrete, marble, ceramic and wood.

The term "gel fraction value" refers to a numerical index relating swellability of a polymer in an organic solvent and the ease of removability of the corresponding coating composition under conventional stripping conditions; gel fraction values greater than 0.95 indicate negligible swellability and polymers having values below 0.95 are considered swellable. The term "sealer" and "base coat" and "primer" are used interchangeably to refer to coating compositions that may be applied directly to a substrate and dried prior to application of coating compositions used in the method of the present invention; base coat or sealer compositions are considered to be removable under conventional stripping conditions for purposes of the present invention.

All percentages referred to will be expressed in weight percent (%), based on total weight of polymer or composition involved, unless specified otherwise. The following abbreviations are used herein: g=grams, cm=centimeters, $cm^2$=square centimeters, mJ=millijoules. Unless otherwise specified, ranges listed are to be read as inclusive and combinable and temperatures are in degrees centigrade (° C).

For the purposes of the present invention, conventional stripping conditions refer to the use of some form of mechanical abrasion (for example, wiping, brushing, mopping or scrubbing) in the presence of solutions (aqueous, aqueous-alcohol or solvent-containing mixtures) containing amine or ammonia (typical contact times of at least 10 to 30 minutes), to provide removal of the entire coating from a coated substrate.

In one embodiment of the invention, the removable radiation curable coatings comprise multi-stage emulsion polymers including at least one multifunctional monomer. The multistage emulsion polymers are easily applied to substrates and provide durable, highly cross-linked coatings upon curing by exposure to low intensity radiation. The multifunctional monomer incorporated into the multi-stage emulsion polymers include chemically reactive functional groups that effect the easy removal of the highly cross-linked coatings from substrates. In addition, the removable curable coatings are applied to substrates without objectionable odors, cured to form optically transparent coatings over substrates and are easily removed from substrates using conventional chemical stripping agents.

The polymers of this invention are multi-staged latex particles made up of at least two mutually incompatible copolymers as described in U.S. Pat. Nos. 5,306,744 and 5,409,971. The resulting polymer are multifunctional. Multifunctional polymers refers to polymer having a plurality of ethylenically unsaturated groups and a plurality of chemically reactive functional groups. "Latex" as used herein refers to a dispersion of a water-insoluble polymer which may be prepared by conventional polymerization techniques such as, for example, by emulsion polymerization. These mutually incompatible copolymers may be present in the following morphological configurations, for example, core/shell, core/shell particles with shell stages incompletely encapsulating the core, core/shell particles with a multiplicity of cores, core/shell particles with a multiplicity of shells, interpenetrating network particles, and the like. In all of these cases the majority of the surface area of the particle will be occupied by at least one outer stage and the interior of the particle will be occupied by at least one inner stage.

The mutual incompatibility of two copolymer compositions may be determined in various ways known in the art. For example, scanning electron microscopy using staining techniques to emphasize the difference between the appearance of the phases or stages is one such technique.

The functionalized multi-stage latex polymer of this invention shall be described as containing a "first stage" and a "second stage." The "second stage" as used herein does not mean to exclude the possibility that one or more polymers can be interposed between or formed on the first stage polymer and before the second stage polymer. In addition, "first stage" and "second stage" are not used to imply in what sequence the polymers are formed.

The first stage polymer may be formed from a mixture of co-monomers containing less than about 10% by weight of at least one cross-linking co-monomer, preferably at a level of from about 1% by weight of the first stage co-monomers to about 5% by weight of the first stage co-monomers.

"Cross-linking co-monomer" as used herein refers to a polyethylenically unsaturated monomer or mixture of ethylenically unsaturated monomers which cross-links a polymer composition during the initial formation thereof. Subsequent drying or other curing techniques are not required. Co-monomers of this type are well known and include monomers wherein the functionality is of substantially equivalent reactivity so that uniform cross-linking occurs. Typically, such co-monomers contain at least two addition polymerizable vinylidene groups and are $\alpha,\beta$-ethylenically unsaturated monocarboxylic acid esters of polyhydric alcohols containing 2-6 ester groups. Suitable cross-linking co-monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of $\alpha,\beta$-unsaturated mono- and dicarboxylic acids having terminal ethylenic unsaturation including allyl methacrylate, allyl acrylate, diallyl maleate, diallyl fumarate, diallyl itaconate and the like. The term "(meth)acrylate" refers to acrylate or methacrylate. Allyl methacrylate is preferred. In one embodiment, the multi-stage polymer includes a highly cross-linked polymer as a first stage or core.

The balance of the first stage polymer can be formed from a wide variety of monomers or mixture of monomers. These monomers include acrylic acid ester monomers, including methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate and the like; acrylic acid, methacrylic acid, itaconic acid, maleic acid, fumaric acid, styrene, substituted styrenes, butadiene, acrylonitrile, ethylene, vinyl acetate, and the like may be used.

Hydrophobic monomers, such as for example, butyl acrylate and styrene, are preferred monomers for the balance of the first stage polymer to impart water resistance and durability to the removable radiation curable coating.

The second stage polymer of this invention contains $\alpha,\beta$-unsaturated carbonyl functional groups which permit the multistage polymer to undergo curing by irradiation. Suitable monoethylenically unsaturated functional groups include (meth)acrylate, fumarate, maleate, cinnamate and crotonates. (Meth)acrylate functional groups are preferred. Alkali soluble emulsion (ASE) polymers and hydrophobically modified alkali soluble emulsion (HASE) polymers are for the balance of the second stage or shell of the polymer to effect the easy removal of the highly cross-linked coating using conventional chemical stripping agents.

The removable radiation curable coating preferably comprises a multi-stage emulsion polymer that includes a highly cross-linked core or first stage and alkali soluble polymer shell or second stage having residual ethylenically unsaturated groups. In a separate embodiment, the removable radiation curable coating comprises a multi-stage emulsion polymer that includes a highly cross-linked core or first stage and alkali soluble polymer shell that is then reacted with a multifunctional monomer to provide a post functionalized shell having residual ethylenically unsaturated groups.

As used herein, acrylate and methacrylate are referred to as "(meth)acrylate", acryloyl group and methacryloyl are referred to as "(meth)acryloyl" and acrylic acid and methacrylic acid are referred to as "(meth)acrylic acid". "Monomer" refers to any chemical species having at least one free radical polymerizable group (ethylenically unsaturated compounds, e.g. acrylate, methacrylate).

The functionalized multi-stage latex polymer emulsion may have a level of solids from about 25% to about 50%, preferably from about 35% to about 45%.

The $\alpha,\beta$-unsaturated carbonyl functional groups may be incorporated into the second stage polymer by employing a multistage polymer wherein the second stage polymer is formed from about 30% by weight to about 60% by weight, preferably from about 35% by weight to about 45% by weight, of an acid-containing co-monomer or mixtures thereof. Useful acid-containing co-monomers include those co-monomers having carboxylic acid functionality, such as for example acrylic acid, methacrylic acid, itaconic acid, fumaric acid, citraconic acid; phosphoethyl methacrylate and the like.

The acid functionality is at least partially neutralized using a suitable base, such as for example, ammonium hydroxide, sodium hydroxide, potassium hydroxide, sodium carbonate and the like. In addition, a quaternary ammonium phase transfer agent, such as for example tetra-butyl ammonium hydroxide, diallyl dimethyl ammonium hydroxide and the like, may be added. The base is added at a level of from about 10 mole % on acid to about 15 mole % on acid if quaternary ammonium phase transfer agent is present. The base is added at a level of about 30 mole % on acid if no quaternary ammonium phase transfer agent is present.

The multi-stage polymer having partially neutralized acid-functionality in the second stage is then reacted with a multifunctional monomer. Multifunctional monomer refers to a monomer having at least one ethylenically unsaturated group and at least one chemically reactive functional group. Suitable multifunctional monomers include but are not limited to monoethylenically unsaturated monoepoxides, monoethylenically unsaturated amines, monoethylenically unsaturated diamines and monoethylenically unsaturated alcohols and polyols.

Suitable monoethylenically unsaturated monoepoxides include glycidyl (meth)acrylate, allyl glycidyl ether, glycidyl cinnamates, glycidyl crotonates, glycidyl itaconates, glycidyl norbornenyl ester, glycidyl norbornenyl ether and the like. In a preferred embodiment, the multi-stage polymer having partially neutralized acid-functionality in the second stage is then reacted with a monoethylenically unsaturated monoepoxide.

The weight ratio of polymer stages including the multifunctional monomer to remaining polymer stages is from 20:80 to 70:30. In one embodiment, the functionalized multistage latex polymer of this invention has a weight ratio of first stage polymer to second stage polymer of from about 20:80 to about 70:30 and preferably from about 30:70 to about 50:50.

In one embodiment the acrylic-based polymer product, comprises, as polymerized monomer units: (a) zero to 60 percent, based on weight of the polymer, of a mono-ethylenically unsaturated monomer containing a carboxylic acid functional group; (b) 1 to 80 and preferably 5 to 70 percent, based on weight of the polymer, of a (meth)acrylic monomer containing functional groups selected from one or more monoethylenically unsaturated monoepoxides, glycidyl (meth)acrylate, allyl glycidyl ether, glycidyl cinnamates, glycidyl crotonates, glycidyl itaconates, glycidyl norbornenyl ester, glycidyl norbornenyl ether and other acrylate containing pendant vinyl groups; (c) zero up to 70, preferably 10 to 40 percent, based on weight of the polymer, of one or more vinyl aromatic monomers; (d) zero up to 90, preferably 20 to 80 percent, based on weight of the polymer, of one or more $(C_1-C_{20})$alkyl (meth)acrylate ester monomers; and (e) zero up to 10 percent, based on weight of the polymer, of one or more other co-polymerizable monomers. Preferably, the polymer product is a radiation-curable composition where the polymer product comprises, as polymerized monomer units methacrylic acid, glycidyl methacrylate and one or more $(C_1-C_{20})$alkyl (meth)acrylate ester monomers, preferably selected from one or more of butyl acrylate and methyl methacrylate. U.S. Pat. Nos. 5,306,744 and 6,197,844 may be consulted for further general and specific details on the preparation of the polymers. Optionally, the polymer also includes zero up to 90, preferably 5 to 80 and more preferably 20 to 75 percent, based on equivalents of carboxylic acid groups of the first polymer, of polyvalent metal ion, preferably selected from one or more of the group consisting of zinc, calcium, magnesium and zirconium. U.S. Pat. Nos. 4,150,005, 4,517,330, 5,149,745 and 5,676,741 may be consulted for further general and specific details of metal cross-linking agents.

In a separate embodiment the shell or outer stage of the multi-stage emulsion polymer comprises an alkali soluble emulsion polymer or a hydrophobically modified emulsion polymer. Alkali soluble/swellable emulsion (ASE) polymers are polyelectrolytes based on acid-containing emulsion polymers disclosed in U.S. Pat. Nos. 3,035,004 and 4,384,096 (HASE polymers) and Great Britain Pat. No. 870,994. The inventors have discovered that adjusting the type and level of acid monomers and co-monomers in ASE polymers coupled with the degree of neutralization to achieve optimum charge density to afford polymers that are stable, having a low degree of swelling and insoluble in an aqueous system of relatively high ionic strength. The polymers usefully employed in the invention have varying degree of neutralization of the carboxylic acid groups ranging from partially to completely neutralized. The polymers can be characterized as incorporating an ionic strength trigger or referred to as ionic strength sensitive polymers. Changes in the ionic strength of the aqueous system to lower levels results in the a polymer that rapidly disperses, dissolves or swells to a significant extent in the aqueous system.

Suitable monoethylenically unsaturated monoamines include but are not limited to (meth)acrylamide, aminoalkyl (meth)acrylates such as aminoethylacrylate, aminodialkylacrylates such as N,N-dimethyl-aminoethyl (meth)acrylate, N,N-dimethyl-aminopropyl(meth)acrylate, and N,N-dimethyl-aminopropyl(meth)acrylamide. Suitable monoethylenically unsaturated diamines include for example ethylene diamine alkyl(meth)acrylates. Suitable monoethelenically unsaturated alcohols include for example 2-hydroxyethyl (meth)acrylate and (meth)acrylic esters of polyethylene glycols.

It is preferred that the coating formulation contains less than about 5.0% by weight, more preferably less than about 3.0% by weight, most preferably less than about 0.5% by weight of water soluble materials including inorganic salts and the residual monomer byproducts of the hydrolysis of the monoethylenically unsaturated monoepoxide, such as dihydroxypropyl methacrylate from the hydrolysis of glycidyl methacrylate and glycerol and methacrylic acid from the further hydrolysis of hydroxypropyl methacrylate. Dried coating formulations having less than 5.0% by weight of these byproducts have improved resistance to water. Suitable methods for removing water soluble materials include treatment by ion exchange resins, filtration and the like.

Other suitable highly durable non-removable compositions normally useful as top coats can be rendered removable according to the invention, including those based on polymers having a gel fraction value of greater than 0.95 and up to 0.99. The top coating compositions may be aqueous-based or solvent-based. While not wishing to be bound by theory, it is believed that the highly durable top-coating compositions should possess some permeability, hence a gel fraction value less than 1.0, to the components (solvent or amine) used in conventional stripping operations so that some portion of the stripping solution may have access to the base-coating composition (over which the top-coating composition is disposed) in order to swell and subsequently remove the entire multi-layer coating composition.

Other suitable compositions for use as the highly durable top-coat compositions in the method of the present invention include, for example, polymers described below:

(I) Acrylic-based polymer product derived from combining (1) a first-stage polymer comprising, as polymerized monomer units (a) 0.1 to 30 percent, based on weight of the first-stage polymer, of a monoethylenically unsaturated monomer containing a carboxylic acid functional group; (b) zero up to 60 percent, based on weight of the first-stage polymer, of a (meth)acrylic monomer containing one or more pendant reactive functional groups selected from vinyl, epoxy, hydroxy, thiol, acetoacetoxy and amino groups; (c) zero up to 70 percent, based on weight of the first-stage polymer, of one or more vinyl aromatic monomers; (d) zero up to 90 percent, based on weight of the first-stage polymer, of one or more ($C_1$-$C_{20}$)alkyl (meth)acrylate ester monomers; and (e) zero up to 10 percent, based on weight of the first-stage polymer, of one or more other co-polymerizable monomers; with (2) a polyfunctional cross-linker agent comprising pendant functional groups selected from one or more of isocyanate, carbodiimide, aziridinyl, vinyl, hydroxy, thiol, acetoacetoxy, amino and epoxy groups; wherein, the first-stage polymer has a number average molecular weight from greater than 5,000 up to 2,000,000; and the polyfunctional cross-linker agent is used in an amount sufficient to provide from 0.2 to 10 equivalents of pendant functional group per equivalent of corresponding pendant reactive functional group in the first-stage polymer.

One embodiment of the polymer (I) is represented by the polymer product derived from combining (1) a first-stage polymer comprising, as polymerized monomer units: (a) 1 to 20 percent, based on weight of the first-stage polymer, of monoethylenically unsaturated monomer containing a carboxylic acid functional group; (b) 2 to 60 percent, based on weight of the first-stage polymer, of a (meth)acrylic monomer containing one or more pendant reactive hydroxy functional groups; and (c) zero up to 20 percent, based on weight of the first-stage polymer, of one or more ($C_1$-$C_{20}$)alkyl (meth)acrylate ester monomers; with (2) a polyfunctional cross-linker agent comprising pendant isocyanate functional groups.

(II) A polyurethane polymer that is the reaction product of at least one polyol with a polyisocyanate reactant comprising as polymerized units: (a) zero up to 20 percent, based on weight of the polyurethane polymer, of a polyol containing a carboxylic acid functional group; (b) 10 to 80 percent, based on weight of the polyurethane polymer, of polyol selected from one or more of saturated and unsaturated polyhydric alcohols, polyester polyols, polyether polyols and polycarbonate polyols; (c) 10 to 30 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols.

Preferably the polyurethane polymer is provided in the form of a dispersion in water. Suitable polyol reactants include, for example, polyols selected from one or more of saturated and unsaturated polyhydric alcohols (such as ethylene glycol, propylene glycol, 1,4-butanediol, 1,4-butenediol and cyclohexanedi-methanol), polyester polyols from the reaction of saturated and unsaturated polyhydric alcohols with saturated and unsaturated polycarboxylic acids (such as maleic acid, itaconic acid, succinic acid, terephthalic acid, phthalic anhydride and dimethyl terephthalate), polyether polyols (such as polyalkylene-glycols) and polycarbonate polyols (such as those formed from the reaction of polyhydric alcohols with diaryl carbonates). Optionally, polyols containing a carboxylic acid functional group may also be used, such as polyhydroxycarboxylic acids, for example, 2,2-dimethylolpropionic acid, 2,2-dimethylolbutyric acid and 2,2-dimethylolvaleric acid. Optionally, capped polyalkyleneglycols (monohydric hydroxy compounds) may be used in addition to the polyols, for example, poly(ethyleneglycol) methyl ether may be used to introduce polyether content into the polyurethane. Typically some portion of the polyol reactant is derived from polyols containing ionic or hydrophilic groups.

Suitable polyisocyanate reactants include, for example, aromatic, cycloaliphatic and aliphatic polyisocyanates such as 1,6-diisocyanatohexane (HDI), 4,4'-diisocyanatodicyclohexylmethane, 1,4-diisocyanatobutane, 2,4- and 2,6-tolylene diisocyanate, 4,4'-diisocyanatodiphenylether, methylene-bis (4-phenylisocyanate), m-phenylene diiusocyanate and 1,2,4-benzene triisocyanate.

For example, a typical polyurethane polymer may contain 10 to 80%, preferably 30 to 70%, of polyol component; 5 to 40%, preferably 10 to 30%, of polyisocyanate component; and optionally zero to 40%, preferably 10 to 30%, of polyether component.

Typically the polyurethane polymer is formed by adding a polyol together with a catalyst (for example, 0.01 to 0.06% of di-butyl tin dilaurate or tin octoate) to a reaction vessel in the presence of solvent (such as N-methyl pyrrolidone, N,N-dimethyl formamide, methyl ethyl ketone, toluene and mixtures thereof) and heating the mixture at 70-100° C. with continuous or intermittent addition, over about 0.5-4 hours, of a polyisocyanate reactant. After complete addition of the polyisocyanate reactant the reaction mixture is maintained at 80-100° C. (typically 2-4 hours) to reduce the residual isocyanate content to below about 8%, based on weight of polymer. The reaction mixture is then cooled and any ionic groups present in the reaction product are neutralized by the addition of a weak base (for example, triethylamine, trimethylamine, dimethylethanolamine, triethanolamine or dimethylaminopropanol). The reaction mixture is then dispersed into water to form the polyurethane dispersion, typically having a final polymer solids level of about 20 to 60%, based on total weight of the dispersion. Optionally, a difunctional amine compound (for example, ethylenediamine, hexamethylene diamine or mixtures thereof) or a polyaziridinyl cross-linker agent may be included in the water medium to provide chain extension of the polyurethane. Alternatively, additional cross-linking may be introduced via air oxidation cure involving other coating formulation components. U.S. Pat. No. 6,384,131 may be consulted for further general and specific details on the preparation of polyurethane dispersions useful as a top-coating compositions.

(III) Acrylic-based polymer product derived from combining (1) a first-stage polymer comprising, as polymerized monomer units: (a) zero up to 20, preferably 1 to 5 percent, based on weight of the first-stage polymer, of monoethylenically unsaturated monomer containing a carboxylic acid functional group; (b) 0.5 to 100, preferably 1 to 40 and more preferably 5 to 20 percent, based on weight of the first-stage polymer, of a (meth)acrylic monomer containing one or more pendant reactive acetoacetoxy functional groups; (c) zero up to 95, preferably 40 to 90 percent, based on weight of the first-stage polymer, of one or more ($C_1$-$C_{20}$)alkyl (meth)acrylate ester monomers; (d) zero up to 10 percent, based on weight of the first polymer, of one or more other co-polymerizable monomers; with (2) an amine-containing reactant selected from one or more of the group consisting of polyamine and aminosilane reactants, in an amount sufficient to provide from 0.1 to 1.5, preferably from 0.3 to 1.0, equivalents of amino functional group per equivalent of acetoacetoxy group in the first-stage polymer; and cross-linking the polymer product through formation of diamine or siloxane linking groups.

Suitable polyamine reactants useful in the preparation of top-coating compositions involving polymer (III) include, for example, polyamines containing 2 to 100 carbon atoms where at least two of the amino groups are primary amine groups.

Suitable aminosilane reactants useful in the preparation of top-coating compositions involving polymer (7) include, for example, trimethoxysilylpropyl-diethylenetriamine, N-methylaminopropyltrimethoxy-silane, aminoethylaminopropylmethyldimethoxysilane, aminoethylamino-propyltrimethoxysilane, amino-propylmethyldimethoxysilane, aminopropyltrimethoxysilane, polymeric amino-alkylsilicone, aminoethylaminoethylaminopropyltrimethoxysilane, N-methylamino-propyltrimethoxysilane, methylaminopropyltrimethoxysilane, aminopropyl-methyldiethoxysilane, aminopropyltriethoxysilane, 4-aminobutyltriethoxy-silane and oligomeric aminoalkylsilanes. Preferably the aminosilane reactant is selected from one or more of aminopropyltrimethoxysilane, aminoethylamino-propyltrimethoxysilane, aminopropylmethyldiethoxysilane and aminoethyl-aminopropylmethyldimethoxysilane. Preferably, the polymer product is derived from combining (1) a first-stage polymer comprising, as polymerized monomer units: (a) 1 to 5 percent, based on weight of the first-stage polymer, of monoethylenically unsaturated monomer containing a carboxylic acid functional group; (b) 5 to 20 percent, based on weight of the first-stage polymer, of a (meth)acrylic monomer containing one or more pendant reactive acetoacetoxy functional groups; and (c) 40 to 90 percent, based on weight of the first-stage polymer, of one or more ($C_1$-$C_{20}$)alkyl (meth)acrylate ester monomers; with (2) an aminosilane reactant in an amount sufficient to provide from 0.3 to 1.0 equivalents of amino functional group per equivalent of acetoacetoxy group in the first-stage polymer. U.S. Pat. No. 5,426,142 may be consulted for further general and specific details on the preparation of aminosilane-modified polymers representative of polymer (III).

Representative suitable monomer components of polymers (I-III) are the same as corresponding monomer component types for polymers described previously and for polymers used to form a base coat over the substrate (polymers IV-VI).

Methods for the preparation of the aqueous dispersible polymers of the coating compositions useful in coatings of the invention and the method of the present invention are well known in the art. Both single and multi-stage polymers may be solution, dispersion or emulsion polymers; preferably the polymers are emulsion polymers. The practice of emulsion polymerization is discussed in detail in D. C. Blackley, Emulsion Polymerization (Wiley, 1975). Suitable monomers may be emulsified with anionic or nonionic dispersing agents; for example, 0.5% to 10% based on the weight of total monomers being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulfite or sodium thiosulfate. The initiator and accelerator, commonly referred to as catalysts, may be used in proportions of 0.1% to 2%, each based on the weight of monomers to be co-polymerized. The polymerization temperature is typically from ambient temperature up to 90° C. Examples of emulsifiers suitable for emulsion polymerization include, for example, alkaline metal and ammonium salts of alkyl, aryl, alkaryl and aralkyl sulfonates, sulfates, polyether sulfates, and alkoxylated derivatives of fatty acids, esters, alcohols, amines, amides and alkylphenols. Chain transfer agents, including mercaptans, polymercaptans and polyhalogen compounds, may be used in the polymerization mixture to control molecular weight of the polymer.

Among the suitable second-coating compositions are radiation-curable compositions, multi-component compositions containing a cross-linking agent, and highly pre-cross-linked compositions that form coating films. Representative of radiation-curable coatings are compositions comprising polymerized units of a polyfunctional isocyanurate having at least three terminal reactive groups reacted with a hydroxyalkyl (meth)acrylate; U.S. Pat. No. 6,197,844 may be consulted for further general and specific details on the use of this type of coating composition.

Photo-polymerization of the curable composition involves irradiation of ethylenically unsaturated compounds in the presence of a photo-initiator, where "photo-initiator" refers to any material or combination of materials that interact with light to generate free radicals suitable for initiating free radical polymerization. Photo-polymerizations occur when radicals are produced by ultraviolet (UV) or visible light irradiation, or combination thereof, of a free radical polymerizable reaction system. Photo-polymerization may be applied in the formation of protective coatings for metal, paper, wood and plastic substrates. Typical applications involve a combination of photo-polymerization and cross-linking, with the cross-linking achieved by the use of polyunsaturated monomers. Suitable systems include acrylate, unsaturated polyester and styrenic-based compositions.

Additionally, UV curable protective coatings may be applied to vinyl flooring during sheet manufacturing processes to provide gloss and abrasion resistance. The curing of these coating compositions is conducted using high intensity light in an inert atmosphere to minimize the deleterious effects of oxygen on the curing process. After application to a substrate, these protective coatings typically cannot be easily stripped from the flooring to which they were applied using conventional stripping methods, such as application of a chemical stripping composition with a stripping pad or brush.

A formulated coating may optionally contain an ultraviolet photo-initiator. The low amount of photo-initiator which can optionally be employed is an additional advantage of the present invention. The photo-initiator may be added to the composition from about 0.2% by weight of total non-volatiles to about 1.0% by weight of total non-volatiles. Useful photo-initiators include cleavage-type initiators, halogenated polynuclear ketones, such as chlorosulfonated benzanthones, chlorosulfonated fluorenones, α-haloalkylated benzanthrones, and α-haloalkylated fluorenone as disclosed in U.S. Pat. Nos. 3,827,957 and 3,827,959; benzoin, its ethers, such as methyl ether, ethyl ether, isopropyl ether, butyl ether, octyl ether and the like; carbonyl compounds such as diacetyl, benzil and the like; sulfur compounds such diphenyl sulfide, dithiocarbamate and the like; α-chloromethyl naphthalene and anthracene. Other useful photo-initiators include alkylphenones and benzophenones as disclosed in U.S. Pat. No. 3,759,807. Photo-initiators suitable for pigmented coatings are suggested in U.S. Pat. Nos. 3,915,824 and 3,847,771.

The formulated coating may contain a thermal initiator if the coating will be cured by heat or a catalyst if the coating will be cured by auto-oxidation. The thermal initiator is added to the composition from about 0.5% by weight of total non-volatiles to about 2% by weight of total non-volatiles. Useful thermal initiators include azo compounds, such as azobisisobutyronitrile and the like; organic peroxides, such as ketone peroxides, hydroperoxides, alkyl peroxides, acyl peroxides, peroxy esters and the like; and inorganic peroxides, such as ammonium persulfate, potassium persulfate, hydrogen peroxide and the like. Useful catalysts for auto-oxidative cure include the salts of cobalt, such as cobalt acetate, cobalt naphthenate and the like.

In addition, conventional coating components such as, for example, pigments, dispersants, surfactants, coalescents (volatile organic solvents including for example glycol ethers), plasticizers (non-volatile organic compounds including for example dibutyl phthalate), wetting agents, rheology modifiers, thickeners, drying retardants, antifoaming agents, colorants, waxes, preservatives, heat stabilizers, ultraviolet light stabilizers and the like may be used in this invention.

Techniques for applying the radiation-curable coating include roller coating, knife coating, squeegeeing, curtain coating, spraying, mopping and the like.

The formulated coating may be cured or cross-linked either by applying radiation or by heating after most or all of the water has evaporated from the mixture. Useful radiation includes ionizing radiation, electron beam radiation and ultraviolet radiation. Sources of ultraviolet radiation include sunlight, mercury lamp, carbon-arc lamp, xenon lamp and the like. Medium pressure mercury vapor lamps are preferred.

"Ultraviolet radiation" and "UV radiation" are used interchangeably to refer to the spectrum of light comprising wavelengths within the range from about 180 nm to 400 nm. "Coatable composition" means a liquid composition that can be applied to a substrate and thereafter solidified (e.g., by UV curing) to form a hardened coating on the substrate. "Radiation curable", in referring to the coatable compositions, means that the coatable composition will form a hardened coating upon exposure to radiation such as UV radiation or visible light (e.g., 180 to 800 nm). "Substrate" refers to any surface upon which the coatable compositions of the invention are applied and includes without limitation, vinyl floor tiles (including tiles previously coated with floor sealer or the like), concrete, ceramic tiles, wood, marble, and the like.

In applying the coatings of the invention to a suitable substrate, it is preferred that the composition be applied in manner which creates a coating no greater than about 1.3 millimeters in thickness in order to facilitate curing of the composition within the aforementioned time limits. Coatings of this thickness can be achieved by any of a number of known application techniques such as roll coating, squeegeeing, knife coating, curtain coating, spray coating, mopping and the like. In applying the forgoing compositions to a substrate, suitable substrates include conventional floor tiles which may or may not be previously coated or sealed. When the substrate to be coated is vinyl tile or the like, it is preferred that the substrate is first treated with a primer or sealer prior to the application of the UV curable inventive compositions to that substrate. A primer treatment of the substrate facilitates the ease at which the UV cured coating may subsequently be removed from the tile or other substrate by a chemical stripping formulation, for example. In order to promote adhesion of the coatable composition to the substrate, an acrylated latex primer is most preferred. The acrylated latex compositions useful herein must have at least one free-radically polymerizable group pendant from each latex particle, and preferably more than one. The latex is hydrophobic in nature, but may contain some hydrophilic groups.

In a separate embodiment of the invention the UV curable coatings are deposited on a base coat which covers a substrate. When applying the base coat to the substrate, it is desirable to provide a continuous film over the surface of the substrate, adjusting the solids content of the primer as needed to achieve such a film while using the least amount of base coat required to achieve a barrier layer with the desired adhesion properties. Typically, the solids content of the base coat required for a wipe on coating (e.g., by hand) will be between about 2 and about 40% by weight, preferably between about 2 and about 30%, and more preferably between about 4 and about 25%. A wetting agent or defoamer may be added to the latex emulsion to improve coating properties. The level of such additives will depend on the nature of the substrate and the concentration of the latex emulsion.

One preferred latex emulsion for use as a base coat herein is the acrylated emulsion commercially available under the trade designation "ROSHIELD 3120" from Rohm and Haas Company, Philadelphia, Pa. This emulsion is available at a solids content of about 40.5% by weight, and a suitable base coat can be prepared by dilution of the concentrated emulsion at dilution weights ratio of up to about 20:1 (water:emulsion). An alternative base coat is an aqueous formulation comprising a blend or the foregoing ROSHIELD 3120 acrylated latex with a second polymer, preferably the ammonium salt of a styrene maleic anhydride (SMA) copolymer (commercially available at a solids content of 38.5% under the trade designation "SMA 1000A" from Atochem, Inc. of Malvern, Pa.). The SMA is added to the base coat to act as a leveling aid. The weight ratio of the acrylate to the SMA copolymer in the primer is preferably between about 3:1 and about 15:1. A small amount of surfactant may also be included in the base coat. A preferred base coat is one having a solids content of about 10% by weight, comprises about 24.4 wt % of the ROSHIELD 3120 acrylated latex, about 73.2 wt % water, about 2.4 wt % SMA 1000A copolymer and about 0.02 wt % surfactant or wetting agent such as that commercially available under the trade designation "MASURF FS-230" from Mason Chemical Company, Arlington Heights, Ill.

The base coat may be applied to the substrate by any suitable method such as wiping, brushing, spraying, mopping and the like. The latex is allowed to dry, typically under ambient conditions, and the UV curable compositions of the invention may then be applied thereover and cured, as described herein. Substrates such as PVC tiles, for example, coated with a UV curable multi-stage polymer of the invention are readily stripped using a conventional chemical stripper. Substrates coated with the above acrylated latex base coat and then coated with a UV curable acrylate (e.g., a coatable composition) may be readily stripped using a conventional chemical stripper such as that described below in the Examples. The stripped tiles present a very good appearance with stripping appearing to occur at the surface of the tile. Corresponding tiles containing no base coat or coated with polymers I-III are slower to strip and generally do not strip cleanly (e.g., at the substrate surface).

In the above described embodiment, the base coat can comprise a component of a floor finishing system that includes both the base coat as well as the coatable composition described herein. Although base coats comprising the foregoing ROSHIELD 3120 acrylated latex (with or without added SMA copolymer) are preferred, other commercially available materials may also be used as base coats or floor polishes on certain substrates such as on PVC composition floor tile. Some suitable base coats include various commercial floor sealers and floor polishes such as those available under the trade designations "CORNERSTONE" (Minnesota Mining and Manufacturing Company, St. Paul, Minn.), "TOPLINE" (also from Minnesota Mining and Manufacturing Company), "TECHNIQUE" (S. C. Johnson of Milwaukee, Wis.), "CASTLEGUARD" (from Buckeye International, Inc. of Maryland Heights, Mo.), "HIGH NOON" (from The Butcher Company of Marlborough, Mass.) and "SIGNATURE" (from S. C. Johnson Profesional of Racine, Wis.). It is also contemplated that the foregoing base coat, especially base coats comprising ROSHIELD 3120 acrylated latex, may be used in other applications outside the floor finishing art to apply any of a variety of UV polymerizable polymers (e.g., other than the foregoing coatable compositions) to a substrate. Accordingly, the use of a base coat provides a system and a method for coating a variety of substrates with UV curable polymer and other durable, highly cross-linked polymers. In such a system and method, the resulting coatings adhere well to the substrate and may also be more easily removed from the substrate by suitable stripper compositions. When using a non-acrylated latex primer it is preferable to use a base coat which has a surface tension of at least 40 dynes/cm.

The cured coatings of the invention may be stripped from the substrates to which they are applied by the application of a suitable stripper. Conventional stripping conditions refer to the use of some form of mechanical abrasion (for example, wiping, brushing, mopping or scrubbing) in the presence of solutions (aqueous, aqueous-alcohol or solvent-containing mixtures) containing amine or ammonia (typical contact times of at least 10 to 30 minutes), to provide removal of the entire coating from a coated substrate. Another suitable stripper is a pH neutral formulation comprising a solvent, coupling agent (e.g., hydrotrope) and water. Dye, fragrance and thickening agent may be added to the stripper composition if desired. An effective stripper formulation for the floor finish compositions of the invention includes those set forth below in the Test Methods.

The formulated coating containing the radiation-curable composition of this invention may be used as topcoats, intermediate coats and base coats. The coatings are useful in applications which require the reduced odor, toxicity and viscosity of aqueous-based, radiation-curable formulations, such as, for example, paints, including wood lacquers; adhesives; inks, including screen printing inks and gravure and flexographic printing inks; plastics, including vinyl sheeting, vinyl flooring and polyvinyl chloride flooring; fiber; paper, including overprint varnishes for paper and board; printed wiring boards and electronic components; concrete; ceramic flooring including tiles; leather; masks, printing plates and other composites using UV cure. The coatings are particularly useful in applications on wood, such as, for example, cabinets, furniture and flooring.

There is provided a floor finishing system comprising the removable curable coating and a base coat composition, wherein the base coat further comprises a conventional coating composition that is in contact with a substrate and is removable from the substrate using one or more chemical stripping agents and wherein the removable curable coating is in contact with the base coat composition.

By utilizing the removable radiation-curable composition of this invention, the need for a separate monomer component in a formulated coating is eliminated. The reduced or eliminated monomer levels improve the safety, health and environmental implications of the uncured and cured coating formulation and eliminate the problems associated with formulating a coating having a separate monomer component, such as for example mixing and dispersion problems. The functionality is incorporated directly into the multi-stage latex polymer providing a one component system with reduced or eliminated levels of monomers.

Other suitable compositions for use as the easily removable base coating composition are those having a gel fraction value in organic solvent of 0.30 to 0.95, preferably from 0.4 to 0.9 and more preferably from 0.5 to 0.8; the first-coating compositions may be aqueous-based or solvent-based. Base coat floor polish compositions of the present invention typically comprise an aqueous suspension or dispersion of one or more water insoluble emulsion polymers containing acid functional residues and, optionally, polyvalent metal ion or complex cross-linking agents. Such base-coat compositions include, for example, acrylic-based polymer products selected from one or more of polymers (IV), (V) and (VI) described below:

(IV) First polymer comprising, as polymerized monomer units (a) 3 to 90, preferably 6 to 30 and more preferably 10 to 15 percent, based on weight of the first polymer, of monoethylenically unsaturated monomer containing a carboxylic acid functional group; (b) zero up to 40, preferably zero up to 25 and more preferably zero up to 15 percent, based on weight of the first polymer, of a (meth)acrylic monomer containing one or more pendant reactive functional groups selected from vinyl and hydroxy groups; (c) zero up to 80 percent, based on weight of the first polymer, of one or more vinyl aromatic monomers; (d) zero up to 97, preferably 20 to 90 and more preferably 60 to 80 percent, based on weight of the first polymer, of one or more ($C_1$-$C_{20}$)alkyl (meth)acrylate ester monomers; (e) zero up to 10 percent, based on weight of the first polymer, of one or more other co-polymerizable monomers; and (f) zero up to 90, preferably 5 to 80 and more preferably 20 to 75 percent, based on equivalents of carboxylic acid groups of the first polymer, of polyvalent metal ion, preferably selected from one or more of the group consisting of zinc, calcium, magnesium and zirconium. U.S. Pat. Nos. 4,150,005, 4,517,330, 5,149,745 and 5,676,741 may be consulted for further general and specific details on the preparation of first-coating compositions representative of polymer (IV).

(V) Second polymer comprising, as polymerized monomer units (a) 3 to 30 and preferably 5 to 20 percent, based on weight of the second polymer, of a monoethylenically unsaturated monomer containing amino-group functionality; (b) 0.2 to 9, preferably 0.2 to 1.5 and more preferably 0.4 to 1 percent, based on weight of the second polymer, of a (meth) acrylic monomer containing one or more pendant reactive functional groups selected from vinyl, epoxy and acetoacetoxy groups; (c) zero up to 80 percent, based on weight of the second polymer, of one or more vinyl aromatic monomers; (d) zero up to 97 percent, based on weight of the second polymer, of one or more $(C_1-C_{20})$alkyl (meth)acrylate ester monomers; and (e) zero up to 10 percent, based on weight of the second polymer, of one or more other co-polymerizable monomers. U.S. Pat. No. 5,676,741 may be consulted for further general and specific details on the preparation of first-coating compositions representative of polymer (V).

(VI) Third polymer derived from combining (i) a first-stage polymer comprising, as polymerized monomer units: (a) 5 to 50 percent, based on weight of the first-stage polymer, of a monoethylenically unsaturated monomer containing an acid functional group selected from one or more of carboxylic, sulfonic and phosphonic groups; (b) zero up to 60 percent, based on weight of the first-stage polymer, of a (meth)acrylic monomer containing one or more pendant reactive functional groups selected from hydroxy, thiol, and amino groups; (c) zero up to 70 percent, based on weight of the first-stage polymer, of one or more vinyl aromatic monomers; (d) 15 to 90 percent, based on weight of the first-stage polymer, of one or more $(C_1-C_{20})$alkyl (meth)acrylate ester monomers; and (e) zero up to 10 percent, based on weight of the first-stage polymer, of one or more other co-polymerizable monomers; with (ii) a polyfunctional cross-linker agent comprising pendant functional groups selected from one or more of isocyanate, carbodiimide, aziridinyl and epoxy groups; wherein, the first-stage polymer has a number average molecular weight from greater than 5,000 up to 2,000,000; and the polyfunctional cross-linker agent is used in an amount sufficient to provide from 0.2 to 5 equivalents of pendant functional group per equivalent of corresponding pendant reactive functional group in the first-stage polymer. The carboxylic acid functional groups of the first-stage polymer are included in the "corresponding pendant reactive functional groups" referred to above.

With reference to aforementioned polymers (IV), (V) and (VI), suitable carboxylic acid monomers include monoethylenically unsaturated $(C_3-C_9)$carboxylic acid monomers, such as unsaturated monocarboxylic and dicarboxylic acid monomers. For example, unsaturated monocarboxylic acids include acrylic acid (AA), methacrylic acid (MAA), α-ethacrylic acid, β,β-dimethylacrylic acid, vinylacetic acid, allylacetic acid, ethylidineacetic acid, propylidineacetic acid, crotonic acid, acryloxypropionic acid and corresponding alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and corresponding alkali and metal salts thereof. Other suitable acidic monoethylenically unsaturated monomers include the partial esters of unsaturated aliphatic dicarboxylic acids (alkyl half esters); for example, the alkyl half esters of itaconic acid, fumaric acid and maleic acid wherein the alkyl group contains 1 to 6 carbon atoms (methyl acid itaconate, butyl acid itaconate, ethyl acid fumarate, butyl acid fumarate and methyl acid maleate). Preferably, the monoethylenically unsaturated $(C_3-C_9)$carboxylic acid monomers are selected from one or more of acrylic acid, methacrylic acid and corresponding alkali and metal salts thereof.

With reference to aforementioned polymers (IV), (V) and (VI), suitable (meth)acrylic monomer containing pendant reactive functional groups include the following: hydroxy-functional (meth)acrylic monomers, for example, hydroxy $(C_1-C_4)$alkyl (meth)acrylates, such as hydroxyethyl methacrylate, hydroxyethyl acrylate, hydroxypropyl methacrylate and hydroxypropyl acrylate—preferably the hydroxy-functional (meth)acrylic monomer is hydroxyethyl methacrylate (HEMA); amino-functional or amino group-containing (meth)acrylic monomers, for example, dimethylaminopropyl (meth)acrylamide, dimethylaminoethyl (meth)acrylate, dimethylaminopropyl (meth)acrylate, t-butylaminoethyl (meth) acrylate and methyaminoethyl acrylate; thiol-functional (meth)acrylic monomers, for example, 2-mercaptopropyl methacrylate; vinyl-containing monomers, for example allyl methacrylate and glycidyl (meth)acrylate; epoxy (meth) acrylic monomers, for example, glycidyl (meth)acrylate; and amine-reactive or air-curable (meth)acrylic monomers, for example, those containing acetoacetoxy groups, such as acetoacetoxyethyl methacrylate (2-(methacryloyloxy)ethyl acetoacetate), acetoacetoxyethyl acrylate, acetoacetoxypropyl acrylate, acetoacetoxypropyl methacrylate, acetoacetoxybutyl acrylate, acetoacetoxybutyl methacrylate, 2,3-di (aceto-acetoxy)propyl acrylate and 2,3-di(acetoacetoxy) propyl methacrylate. In addition to the above, non-(meth) acrylic monomers containing pendant reactive functional groups may be used, such as divinylbenzene and allyl acetoacetate.

With reference to aforementioned polymers (1), (2) and (3), suitable vinylaromatic monomers include, for example, styrene, α-methyl styrene and substituted styrenes, such as vinyl toluene, 2-bromostyrene, 4-chlorostyrene, 2-methoxystyrene, 4-methoxystyrene, α-cyanostyrene, allyl phenyl ether and allyl tolyl ether. When present, the vinylaromatic monomer is preferably styrene.

With reference to aforementioned polymers (1), (2) and (3), suitable $(C_1-C_{20})$alkyl (meth)acrylate ester monomers include, for example, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth) acrylate, undecyl (meth)acrylate, dodecyl (meth)acrylate (also known as lauryl (meth)acrylate), tridecyl (meth)acrylate, tetradecyl (meth)acrylate (also known as myristyl (meth) acrylate), pentadecyl (meth)acrylate, hexadecyl (meth)acrylate (also known as cetyl (meth)acrylate), heptadecyl (meth) acrylate, octadecyl (meth)acrylate (also known as stearyl (meth)acrylate), nonadecyl (meth)acrylate, eicosyl (meth) acrylate and combinations thereof. Typically, the $(C_1-C_{20})$ alkyl (meth)acrylate esters are $(C_1-C_8)$alkyl (meth)acrylate esters and preferably $(C_1-C_8)$alkyl acrylate esters; more preferably, the $(C_1-C_8)$alkyl acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

With reference to aforementioned polymers (IV), (V) and (VI), suitable other copolymerizable monomers include, for example, butadiene, divinylbenzene, acrylonitrile, methacrylonitrile, crotononitrile, α-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol (such as vinyl formate, vinyl acetate, vinyl propionate, vinyl butyrate and vinyl versatate), poly(alkyleneoxide) di(meth)acrylates, butanediol acrylate, 3-chloro-2-hydroxypropyl acrylate; amides of ethylenically unsaturated $(C_3-C_6)$carboxylic acids, amides of ethylenically unsaturated $(C_3-C_6)$carboxylic acids that are substituted at the nitrogen by one or two $(C_1-C_4)$alkyl groups, acrylamide, methacrylamide and N-methylol (meth)acrylamide; monoethylenically unsaturated monomers containing sulfonic acid or phosphonic groups (such as 2-acrylamido-2-methyl-1-propanesulfonic acid, 2-methacrylamido-2-methyl-1-propanesulfonic acid, 3-methacryl-amido-2-hydroxypropanesulfonic acid, allyl sulfonic acid, methallyl-sulfonic acid, allyloxybenzene sulfonic acid, methallyloxybenzenesulfonic acid, 2-hydroxy-3-(2-propenyloxy)propane sulfonic acid, 2-methyl-2-propene-1-sulfonic acid, styrene sulfonic acid, vinyl sulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate); and acetoacetoxy-containing, carboxyl-containing, vinyl-containing, amino-containing, epoxy-containing, thiol-containing and hydroxy-containing monomers not otherwise already present in the polymer composition.

With reference to the aforementioned polymer (IV), suitable polyvalent metal ions include, for example zinc, cadmium, nickel, zirconium, strontium, tin, calcium, magnesium and copper; preferably the polyvalent metal ion is selected from one or more of the group consisting of zinc, calcium, magnesium and zirconium. When used, the amount of polyvalent metal ion and optionally a basic hydroxide or salt of an alkali metal, is from 5 to 80% of the equivalents of the acid residues in the polymer. Suitable monovalent alkali metal ions include, for example, lithium, sodium and potassium ions. U.S. Pat. Nos. 4,517,330 and 5,149,745 may be consulted for further general and specific details on the preparation of aqueous-based emulsion polymers cross-linked with polyvalent metal ions. The optional polyvalent metal ions are typically added to the aqueous medium of the coating composition (pH of 4 to 8) as an aqueous slurry of the oxides, hydroxides, ammonia or polyamine complexes, and carbonates or bicarbonates of the corresponding metal ion, for example, $CaCO_3$, $ZnO$ and $Mg(OH)_2$. The polyvalent metal ions may be incorporated into the coating composition at any stage of its formulation. Similarly, the basic salt of the alkaline metal may be incorporated with the polyvalent metal ion at any stage of formulating the coating composition.

With reference to the aforementioned polymer (VI), suitable polyfunctional cross-linker agents include those containing one or more pendant functional groups selected from isocyanate, carbodiimide, aziridinyl and epoxy groups. When the pendant functional group is an isocyanate group, it will react with corresponding reactive hydroxy or thiol functional groups in the first-stage polymer. When the pendant functional group is a carbodiimide group, it will react with corresponding carboxyl reactive functional groups in the first-stage polymer. When the pendant functional groups are aziridinyl or epoxy groups, they will react primarily with corresponding thiol or amino reactive functional groups in the first-stage polymer.

Suitable polyisocyanate, polycarbodiimide, polyaziridinyl and polyepoxy cross-linker agents may be based on any aliphatic, aromatic (or mixture thereof) backbone polymer suitably substituted with the desired pendant functional groups. For example, the backbone polymers may be prepared by conventional vinyl polymerization or condensation polymerization reactions where the pendant functional groups are incorporated during polymer formation or by post-reaction. Typically, the amount of polyfunctional cross-linker agent used relative to the first-stage polymer in preparing the aforementioned type (3) polymers will be in an amount sufficient to provide from 0.2 to 5, preferably from 0.4 to 4 and more preferably from 0.6 to 2, equivalents of isocyanate, carbodiimide, aziridinyl or epoxy functional group, per equivalent of corresponding pendant reactive functional group in the first-stage polymer. Typically, this corresponds to 1 to 90%, preferably from 5 to 75% and more preferably from 10 to 50%, of polyfunctional crosslinker, based on weight of the first-stage polymer.

When the pendant functional groups of the polyfunctional crosslinker agents are carbodiimide, aziridinyl or epoxy groups, the backbone polymer may be based on any suitable vinyl monomer carrying the corresponding functional group (such as glycidyl methacrylate) or reactive group that is capable of post reacting to attach the carbodiimide, aziridinyl or epoxy group. Alternatively, polyfunctional crosslinker agents based on isocyanate, carbodiimide, aziridinyl or epoxy group functionality may be derived from non-polymeric materials, as long as they are "polyfunctional" in terms of crosslinking efficacy. Suitable polyepoxide crosslinkers include, for example, $(C_4$-$C_8)$diepoxyalkanes and diepoxyaralkanes such as, 1,2,3,4-diepoxybutane, 1,2,4,5-diepoxypentane, 1,2,5,6-diepoxyhexane, 1,2,7,8-diepoxyoctane, 1,4- and 1,3-divinylbenzene diepoxides, $(C_6$-$C_{15})$polyphenol polyglycidyl ethers (such as 4,4'-isopropylidene-diphenol diglycidyl ether (also known as bisphenol A diglycidyl ether) and hydroquinone diglycidyl ether), polyglycidyl ethers of $(C_2$-$C_6)$alkanepolyols and poly(alkylene glycols) such as, ethylene glycol diglycidyl ether, diethylene glycol diglycidyl ether, polyethyleneglycol diglycidyl ether, glycerine diglycidyl ether and triglycidyl ether, propylene glycol diglycidyl ether and butanediol diglycidyl ether, and polyglycidyl ethers of erythritol, trimethylolethane and trimethylol-propane.

Suitable polyaziridinyl crosslinkers include, for example, polyaziridinyl derivatives of $(C_2$-$C_6)$alkanepolyols such as, pentaerythritol-tris[β-(N-aziridinyl)-propionate], trimethylolpropane-tris[β-(N-aziridinyl)propionate], pentaerythritol-bis[β-(N-aziridinyl)propionate] and trimethylolpropane-bis-[β-(N-aziridinyl)-propionate].

When the pendant functional groups of the polyfunctional cross-linker agent are isocyanate groups, the cross-linkers are typically referred to as polyisocyanates, such as the water-dispersible polyisocyanates and mixtures of polyisocyanates that are commercially available, for example, from Bayer Corporation (such as Bayhydur™ XP-7063, XP-7148, and XP-7165 polyisocyanates), Miles Corporation or Rhodia Corporation. U.S. Pat. No. 5,252,696 may be consulted for further general and specific details regarding suitable water-dispersible hydrophilically-modified polyisocyanates that may be used as the polyfunctional cross-linking agent. Suitable polyisocyanates include, for example, those based on derivatives of 1,4-diisocyanatobutane, 1,6-diiso-cyanatohexane (HDI), 1,5-diisocyanato-2,2-dimethylpentane, 2,2,4-trimethyl-1,6-diisocyanatohexane, 2,4,4-trimethyl-1,6-diisocyanatohexane, 1,10-diisocyanato-decane, 1,3-diisocyanatocyclohexane, 1,4-diisocyanatocyclohexane, 1-isocyanato-3,3,5-trimethyl-5-isocyanatomethylcyclohexane (isophorone diisocyanate, IPDI), 4,4'-diisocyanatodicyclohexylmethane, triisocyanates (such as 2,4,4'-triiso-cyanatodiphenyl ether, 4,4',4"-triisocyanatotriphenylmethane and trimeric 1,6-diisocyanatohexane) and dimeric 1,6-diisocyanatohexane. Preferably the polyisocyanates used as the polyfunctional cross-linker agent are based on hydrophilically-modified derivatives of 1,6-diisocyanatohexane. Additional polyisocyanates, include, for example, those based on aromatic diisocyanates such as 2,4- and 2,6-tolylene diisocyanate, m-phenylene diisocyanate, xylylene diisocyanate, 4,4'-biphenylene diisocyanate, 1,5-naphthylene diisocyanate; preferably the polyisocyanates used as the polyfunctional cross-linker agent are substantially free of aromatic isocyanate derivatives, that is, from zero to less than 5%, more preferably from zero to less than 1% and most preferably from zero to less than 0.5%, based on weight of polyfunctional cross-linker agent.

In addition to the aforementioned (IV), (V) and (VI) acrylic-based polymer products suitable for use as base coating compositions, acid-functionalized polyurethane polymers may also be used. For example, the first-coating composition may be a polyurethane polymer that is the reaction product of at least two polyol reactants and a polyisocyanate reactant comprising as polymerized units: (a) 2 to 50, preferably 5 to 15 percent, based on weight of the polyurethane polymer, of polyol containing a carboxylic acid functional group; (b) 2 to 80, preferably 30 to 70 percent, based on weight of the polyurethane polymer, of polyol selected from one or more of saturated and unsaturated polyhydric alcohols, polyester polyols, polyether polyols and polycarbonate polyols; (c) 20 to 70, preferably 30 to 50 percent, based on weight of the polyurethane polymer, of a polyisocyanate reactant selected from one or more of aromatic, cycloaliphatic and aliphatic polyisocyanates; and (d) zero up to 40 percent, based on weight of the polyurethane polymer, of a polyether selected from one or more of capped polyalkyleneglycols and polyether polyols; wherein calcium ion cross-linker agent is present in an amount sufficient to provide from 0.05 to 0.9, preferably 0.3 to 0.6, equivalents of calcium ion per equivalent of corresponding carboxylic acid functional group.

Typically the acid-functionalized polyurethane polymers are prepared as pre-polymers formed from the reaction of diol compounds (such as polypropylene glycols), diisocyanate compounds (such as isophorone diisocyanate) and a polyhydroxycarboxylic acid (such as 2,2-dimethylolpropionic acid) in an organic solvent in the presence of a base catalyst and further reacting the pre-polymers with chain extending agents such as polyamines. Further examples of suitable polyols, acid-functionalized polyols and polyisocyanate reactants may be found in the discussion of polymer (6).

Preferably, the acid-functionalized polyurethanes have from 2 to 20 acid functional groups per polyurethane repeating unit. Suitable calcium compounds useful for forming the calcium cross-links include, for example, calcium oxide, calcium hydroxide and calcium carbonate. U.S. Pat. No. 5,912,298 may be consulted for further general and specific details on preparation of the acid-functionalized polyurethane polymers useful as first-coating compositions.

In one embodiment of the invention, a sealer or base coat composition may be applied directly to a substrate and dried prior to application of the first-coating composition, thus providing a layer over the substrate to which the first-coating composition may bond. Suitable base coat compositions include, for example, acrylic polymer latices having a solids content from about 2 to about 40% and preferably from 4 to 25%. Preferably the acrylic polymer latices are hydrophobic in nature, but may contain some hydrophilic groups. Suitable primer compositions include those commercially available from Rohm and Haas Company (Philadelphia, Pa, USA), such as ROSHIELD™ 3120 emulsion having a polymer solids content of about 40% by weight; preferably this emulsion concentrate is diluted with water (up to a ratio of 1 to 20 parts water per 1 part emulsion) before being applied as a base coat. Although primer formulations containing the aforementioned ROSHIELD™ 3120 emulsion are preferred, other commercially available materials may also be used as base coats or sealers as described above.

Base coat formulations may be applied to a substrate by any suitable method, for example, wiping, brushing, mopping and spraying. The latex is allowed to dry, typically under ambient conditions, and the base coat compositions used in the present invention may then be applied and allowed to dry and harden.

The measurement of gel fraction is used as an indication of swellability of the polymer and its relative ease of removability under stripping conditions. Uncross-linked amorphous polymers, polymers that are lightly cross-linked, or those that have not undergone a sufficient degree of intermolecular cross-linking will be highly solvated by appropriate solvents and therefore 'swellable.' Because of their reduced free volume, polymers that have been sufficiently cross-linked in an intermolecular manner will be solubilized to a lesser extent, indicative of decreased swellability. These less solubilized polymer molecules will be swollen to form a soft gel which can be centrifuged out of the organic solvent solution. Other variables, such as polymer molecular weight, polymer composition, the composition of the solvent selected, and the affinity of the polymer and solvent for each other, will influence the gel fraction. For polymers based on acrylic esters and styrene as the major monomers, tetrahydrofuran (THF) is an appropriate solvent for determining gel fraction. More hydrophilic polymers, such as those based on moderately high levels of acidic or non-ionogenic hydrophilic monomers, are more readily solvated by acetone. Other solvents may be selected as appropriate to the composition of the polymers to be tested, but because the polymer is added to the solvent from an aqueous emulsion, it is preferred that the solvent be compatible or miscible with water. U.S. Pat. No. 5,676,741 may be consulted for further general and specific details regarding the determination of gel fraction values for polymers.

Typically, gel fraction values may be determined by charging a weighed aliquot of solvent ($W_v$) to a weighed sample of polymer emulsion ($W_p$) of known solids content ($W_s$) into a centrifuge tube. The mixture is then stirred overnight and subjected to ultracentrifugation. A weighed aliquot of the supernatant solution is then evaporated to dryness to determine the solid fraction ($S_s$). The soluble fractions and gel fractions are calculated as follows:

Soluble Fraction=$[S_s(W_v+W_p-W_s)]/W_s$

Gel Fraction=[1−Soluble Fraction]

One embodiment of the present invention involves coated surface compositions that are provided by preparing multi-layer protective coatings by the method of the present invention. Preferred coated surface compositions include, for example, substrates bearing a multi-layer coating composition where the first-coating composition is an acrylic-based polymer product comprising, as polymerized monomer units: (a) 3 to 90 percent, based on weight of the polymer, of monoethylenically unsaturated monomer containing a carboxylic acid functional group; (b) zero up to 40 percent, based on weight of the polymer, of a (meth)acrylic monomer containing one or more pendant reactive functional groups selected from vinyl and hydroxy groups; (c) zero up to 80 percent, based on weight of the polymer, of one or more vinyl aromatic monomers; (d) zero up to 97 percent, based on weight of the polymer, of one or more ($C_1$-$C_{20}$)alkyl (meth)acrylate ester monomers; (e) zero up to 10 percent, based on weight of the polymer, of one or more other co-polymerizable monomers; and (f) zero up to 90 percent, based on equivalents of carboxylic acid groups of the polymer, of polyvalent metal ion. Additional preferred coated surface compositions include, for example, substrates bearing a multi-layer coating composition where the second-coating composition is an acrylic-based polymer product comprising, as polymerized monomer units: (a) zero to 30 percent, based on weight of the polymer, of a monoethylenically unsaturated monomer containing a carboxylic acid functional group; (b) 1 to 80 percent, based on weight of the polymer, of a (meth)acrylic monomer containing functional groups selected from one or more of isocyanurate, pendant vinyl, pendant acetoacetoxy and pendant amino groups; (c) zero up to 70 percent, based on weight of the polymer, of one or more viny laromatic monomers; (d) zero up to 90 percent, based on weight of the polymer, of one or more ($C_1$-$C_{20}$)alkyl (meth)acrylate ester monomers; and (e) zero up to 10 percent, based on weight of the polymer, of one or more other co-polymerizable monomers.

In a separate embodiment there is also a provided a method for applying a highly cross-linked coating as one or more layers to a substrate and subsequently removing all coating layers from a substrate comprising the steps of:

(a) applying one or more layers of a coating comprising a curable, removable emulsion polymer;

(b) curing the composition to form a highly cross-linked coating over the substrate by exposing the composition to ultraviolet radiation; and (c) removing all coating layers from the substrate by exposing the coating to one or more chemical stripping agents.

The present invention also provides a method for preparing a multi-layer coating composition comprising (a) applying a first-coating composition to a substrate wherein the first-coating composition comprises a polymer product having a gel fraction of 0.3 to 0.95 in a solvent selected from one or more of acetone and tetrahydrofuran and wherein the first-coating composition is applied in one or more separate applications, allowing the first-coating composition to dry after each application; and (b) applying one or more layers of a coating comprising a curable, removable emulsion polymer.

The method of the present invention may be illustrated by the following description. A substrate is coated with a base coat that is readily removable under conventional stripping conditions, where the first-coating composition has a gel fraction value in organic solvent of 0.30 to 0.95. The base coat is typically applied in a single step and allowed to dry; optionally the base coating may be applied in multiple steps where each application is allowed to dry before the next application; in the case of multiple applications, 2 to 5 separate applications are typically used, followed by a final drying step to allow the base coating to harden. The coating compositions useful in the present invention readily dry at temperatures as low as 10° C. For the purposes of the present invention, "allowed to dry" (as in 'each application is allowed to dry before the next application') refers to the coating composition drying and hardening to the point where the surface is no longer soft or tacky to the touch under light finger pressure.

After the base coating has been applied onto a surface, a removable, UV curable coating is applied over and onto the dried base coat composition. The top coat composition has a gel fraction value in organic solvent of greater than 0.95 and up to 0.99. Similarly to that described above for application of the base coating composition, the removable UV curable composition may be applied in one or more separate applications where each application is allowed to dry before the next application, followed by a final drying step to allow the top coating composition to dry and harden. In one embodiment the top composition itself is highly durable and removable under conventional stripping conditions. In another embodiment the top composition itself is highly durable and resistant to removal under conventional stripping conditions ('non-removable') if it were to be applied directly to a hard surface substrate, or optionally over a primer or sealer layer applied to the substrate. However, the resultant multi-layer coating compositions of the present invention, comprising the second-coating composition applied onto the first-coating composition, provide enhanced durability and detergent resistance, yet are readily removable under conventional stripping conditions.

Some embodiments of the invention are described in detail in the following Examples. All ratios, parts and percentages are expressed by weight and all reagents used are of good commercial quality unless otherwise specified. Abbreviations used in the Examples and Tables are listed below with the corresponding descriptions:

| | |
|---|---|
| BA = | butyl acrylate |
| MMA = | methyl methacrylate |
| GMA = | glycidyl methacrylate |
| AA = | acrylic acid |
| MAA = | methacrylic acid |
| HEMA = | hydroxyethyl methacrylate |
| ST = | styrene |
| BHMR = | black heel mark resistance (% coverage) |
| [NCO] = | isocyanate concentration [equivalents] |
| [OH] = | hydroxyl or hydoxy group concentration [equivalents] |

Test Methods

Mar Resistance: This test is based on striking the coating at a shallow angle with a hard object; in the examples provided, the object was the fingernail of the individual performing the test. This test gives an indication of how the coating will resist marring, which leads to gloss reduction of the coating.

After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating.

When comparing coatings, it was important that the same operator perform the test. This test was designed to distinguish relative differences.

The following rating system was used:

| Rating | Appearance |
|---|---|
| 1 - Excellent (Exc) | No perceptible marks |
| 3 - Good | Marks which appear as thin scratches (<1 mm) |
| 5 - Poor | Marks which are wide (>1 mm) |

Black Heel Mark Resistance (BHMR): The method for determining black heel described in Chemical Specialty Manufacturers Association Bulletin No. 9-73 was utilized, except that commercially available rubber shoe heels were used in place of the recommended 5.08 cm (2 inch) rubber cubes. Furthermore, instead of subjectively rating the coated substrate, the percentage of the coated substrate area covered by black heel marks was determined; this was conveniently performed with transparent graph paper. A black heel mark is an actual deposition of rubber onto or into the coating.

Detergent Resistance: The method for determining detergent resistance is described in "Annual Book of ASTM Standards," Section 15, Volume 15.04, Test Procedure ASTM D 3207 (2000), except that a 1/20 dilution of Forward™ (S. C. Johnson and Sons, Inc., Racine, Wis.) in water was used as test detergent solution and a 1000-g weight was added to the brush assembly.

Removability: The method for determining polish removability is described in "Annual Book of ASTM Standards," Section 15, Volume 15.04, Test Procedure ASTM D-1792 (2000), except that a 1000-g weight was added to the boat assembly and a 1:2 aqueous mixture (1 part commercial stripper solution/2 parts water) of commercial stripper solution (5-15% 2-butoxyethanol and 30-40% monoethanolamine in water, provided as "FloorStar Power Strip" from ServiceMaster Company, Downers Grove, Ill.) was used as the stripping solution. Additionally, a commercial stripping solution of 5-15% 2-butoxyethanol and 30-40% monoethanolamine in water was further diluted with warm water (130-150° F.) and allowed to reside on the coated panel for 10 minutes before starting the scrub cycle.

Coating Application and Testing: The method for applying the floor polish (base coat or top coat) to substrates for testing purposes is described in "Annual Book of ASTM Standards," Section 15, Volume 15.04, Test Procedure ASTM D 1436 (2000). Test Method B (application of emulsion floor polish with a hand applicator) was used.

Preparation of multi-layer coatings: two coats of base coat polymer polish followed by two coats of top coat polymer were applied to vinyl composition panels with about one hour between coats. After the final coat, the coated panels were allowed to cure at 25° C. for 24 hours before testing. This format was used to evaluate mar, black heel mark and detergent resistance as well as polish film removability.

The following abbreviations and terms are used as indicators of position on scales of ratings used in reporting the "detergent resistance" and "ease of removability" characteristics, where "Very Poor" is the lowest rating and "Excellent" the highest rating:

| | |
|---|---|
| VP = | Very Poor |
| P = | Poor |
| F = | Fair |
| G = | Good |
| VG = | Very Good |
| Exc = | Excellent |

Formulation of Base Coat (First-Coating) Composition

The base coat floor polish was formulated by combining the various components listed below in Table 1 in the order indicated. The base coat polymer used to prepare samples of the multi-layer coating compositions of the present invention is described in Example 1.

EXAMPLE 1

Emulsion polymer having a composition of 30 BA/10.5 MMA/5 HEMA/4.5 MAA//40 ST/5 MMA/5 AA prepared as described in U.S. Pat. No. 4,150,005. The polymer emulsion further contained 40 equivalent % $Zn^{++}$ (added as zinc ammonium bicarbonate). The pH of the emulsion was adjusted to 9.0 with a final polymer solids content of 38%.

TABLE 1

Base Coat Floor Polish (see order of addition below)

| Material | Function | Amount (parts by weight) |
|---|---|---|
| Water | diluent | 31.57 |
| Zonyl ™ FSJ (1%)[1] | wetting agent | 0.50 |
| Kathon ™ CG/ICP (1.5%)[2] | biocide | 0.03 |
| SE-21[3] | defoamer | 0.02 |
| Diethylene Glycol Ethyl Ether | coalescent | 2.04 |

TABLE 1-continued

Base Coat Floor Polish (see order of addition below)

| Material | Function | Amount (parts by weight) |
|---|---|---|
| Dipropylene Glycol Methyl Ether | coalescent | 2.04 |
| Dibutyl Phthalate | plasticizer | 0.93 |
| Tributoxy Ethyl Phosphate | leveling aid | 0.93 |
| Polymer Emulsion (Example 1) | vehicle | 45.68 |
| Michem Dispersion MD-915 (30%)[4] | alkali-soluble resin | 3.86 |
| AC-392N (35%)[5] | aqueous polyethylene wax emulsion | 6.41 |
| Epolene E-43N (40%)[6] | aqueous polyethylene wax emulsion | 5.79 |

[1] blend of flurosurfactant and a hydrocarbon surfactant (Zonyl ™ FSJ from E.I. duPont de Nemours, Wilmington, DE)
[2] isothiazolone mixture (Rohm and Haas Co., Philadelphia, PA)
[3] aqueous dispersion of polydimethylsiloxane (Wacker Silicones Corp., Adrian, MI)
[4] low molecular weight anionic polymer, aqueous dispersion (Michelman, Morristown, NJ)
[5] low molecular weight nonionic polyethylene, aqueous dispersion (Honeywell, Morristown, NJ)
[6] low molecular weight nonionic polypropylene, aqueous dispersion (Eastman Chemical, Morristown, NJ)

Formulation of Ton Coat (Second-Coating) Composition 1

A top coat floor polish was formulated by combining the various components listed below in Table 2 in the order indicated. The top coat polymer used to prepare this floor polish formulation is described in Example 2.

EXAMPLE 2

Emulsion polymer having a composition of 53 MMA/34 BA/10 HEMA/3 MAA (pH=7.5, final polymer solids of 41%) with an [OH] equivalent weight of 3100, based on the HEMA content of the emulsion polymer, was used as the Part A polymer emulsion component in Table 2.

EXAMPLE 2A

Water-dispersible polyisocyanate based on diisocyanate derivatives is available as Bayhydur™ XP-7063 polyisocyanate (100% active ingredient, 17.1% [NCO], 245 g/equivalent [NCO]) from Bayer Corporation, Pittsburgh, Pa., and was used as component B in Table 2.

The top coat formulation was prepared by slowly adding Part B to Part A, followed by mild agitation for 5-10 minutes, to provide a final top coat polish formulation having 33.6% solids with an [NCO]:[OH] stoichiometric ratio of 1.1:1.

TABLE 2

Top Coat Floor Polish 1 (see order of addition below)

| Material | Function | Amount (parts by weight) |
|---|---|---|
| Part A: | | |
| Polymer Emulsion (Example 2) | acrylic emulsion | 62.95 |
| Premix and add under agitation: | | 0.50 |
| Water | diluent | 25.23 |
| Dipropylene Glycol Monomethyl Ether (DPM) | solvent | 1.89 |

TABLE 2-continued

Top Coat Floor Polish 1 (see order of addition below)

| Material | Function | Amount (parts by weight) |
|---|---|---|
| Then add: | | |
| Byk 346[1] | flow Aid | 0.09 |
| Acrysol ™ RM-825[2] | rheology modifier | 0.19 |
| Tego Glyde ™ 410[3] (50% in DPM) | mar aid | 0.19 |
| Tego Foamex ™ 805[3] | defoamer | 0.94 |
| Surfynol ™ 104DPM[4] | wetting aid | 0.47 |
| Part B: | | |
| Bayhydur ™ XP-7063 | polyisocyanate | 5.50 |

[1]available from Byk Chemie
[2]available from Rohm and Haas Co., Philadelphia, PA
[3]available from Goldschmidt Chemical Corp.
[4]available from Air Products & Chemicals, Inc.

Formulation of Top Coat (Second-Coating) Composition 2

A radiation-curable top coat floor polish was formulated by combining the various components listed below in Table 3 in the order indicated. The top coat polymer used to prepare this floor polish formulation is described in Example 3.

EXAMPLE 3

Emulsion polymer having a composition of 37 BA/20 MMA/24 GMA/19 ST (typical pH=7.1, final polymer solids of 40-41%) was used as the polymer emulsion component in Table 3.

The top coat formulation was prepared by mixing the ingredients as listed in Table 3 to provide a final top coat polish formulation having 38% solids with a pH of 6.8.

The top coat formulation 2 was applied to panels as described under "Coating Application and Testing" section, allowed to dry and stored approximately 30 minutes at ambient temperature followed by curing in a UV apparatus. The curing system was Fusion UV-System, HP-6 series, with an H bulb, rated at 197 W (watts)/cm. The panels were passed under the UV light six times at a speed of 22 cm/second (44 feet/minute). The dosage was adjusted to 630 mJ/cm$^2$ per pass. The samples were passed through the focal plane of the lamp.

TABLE 3

Top Coat Floor Polish 2 (see order of addition below)

| Material | Function | Amount (parts by weight) |
|---|---|---|
| Polymer Emulsion (Example 3) | acrylic emulsion | 92.4 |
| Add under agitation: | | |
| Darocur ™ 1173[1] | photoinitiator | 0.55 |
| Water | diluent | 5.38 |
| Tego Glyde ™ 410[2] (50% in DPM) | mar aid | 0.23 |
| Surfynol ™ 104DPM[3] | wetting aid | 0.54 |
| Acrysol ™ RM-825[4] | rheology modifier | 0.70 |
| Byk 346[5] | flow aid | 0.09 |

[1]available from Ciba-Geigy Corp.
[2]available from Goldschmidt Chemical Corp.
[3]available from Air Products & Chemicals, Inc.
[4]available from Rohm and Haas Co., Philadelphia, PA
[5]available from Byk Chemie Experimental Test Results Testing of coating compositions represented by Examples 4-8 demonstrates the improvement in performance properties of coating formulations using the multi-layer coating compositions of the present invention.

EXAMPLE 4 (COMPARATIVE)

Coating composition coated onto test panel using coating formulation described in Table 1 (base coat alone).

EXAMPLE 5 (COMPARATIVE)

Coating composition coated onto test panel using coating formulation described in Table 2 (top coat floor polish 1 alone).

EXAMPLE 6 (PRESENT INVENTION)

Multi-layer coating composition coated onto test panel using base coat formulation described in Table 1 and top coat formulation 1 described in Table 2, applied as described under "Coating Application and Testing" section.

EXAMPLE 7 (COMPARATIVE)

Coating composition coated onto test panel using coating formulation described in Table 3 (top coat floor polish 2 alone).

EXAMPLE 8 (PRESENT INVENTION)

Multi-layer coating composition coated onto test panel using base coat formulation described in Table 1 and top coat formulation 2 described in Table 3, applied as described under "Coating Application and Testing" section.

Tables 4 and 5 summarize the performance properties of the multi-layer coating compositions of the present invention with regard to durability and ease of removability. Multi-layer coating compositions of the present invention, represented by Examples 6 and 8, combine the durability benefits (mar, black heel mark and detergent resistance) of the individual top coat compositions (Examples 5 and 7) with the ease of removability of the base coat composition (Example 4), but without the poor removability of the individual top coat compositions or the poor durability of the base coat composition when used alone.

TABLE 4

| | Ex 4* | Ex 5* | Ex 6 |
|---|---|---|---|
| Base Coat | Yes | No | Yes |
| Top Coat | No | Yes | Yes |
| Mar Resistance | 3 | 1 | 1 |
| BHMR (% Coverage) | 5.7 | 2.1 | 1.9 |
| Detergent Resistance | Good | Exc | Exc |
| Removability | Exc | Poor | Good |

*= comparative

TABLE 5

| | Ex 4* | Ex 7* | Ex 8 |
|---|---|---|---|
| Base Coat | Yes | No | Yes |
| Top Coat | No | Yes | Yes |
| Mar Resistance | 3 | 1 | 1 |
| BHMR (% Coverage) | 5.7 | 2 | 2 |

TABLE 5-continued

| | Ex 4* | Ex 7* | Ex 8 |
|---|---|---|---|
| Detergent Resistance | Good | Exc | Exc |
| Removability | Exc | Poor | Good |

*= comparative

We claim:

1. A method for applying a UV cured, highly cross-linked coating as one or more layers to a substrate and subsequently removing all coating layers from a substrate comprising the steps of:
    (a) applying one or more layers of a coating comprising a curable, removable multi-stage emulsion polymer;
    wherein a shell of said multi-stage emulsion polymer comprises a carboxylic acid-containing emulsion polymer that comprises, as polymerized units, one or more comonomers having carboxylic acid functionality, and
    wherein said multitstage emulsion polymer further comprises 5 to 80 percent, based on equivalents of acid groups, polyvalent metal ion,
    (b) curing the composition to form a highly cross-linked coating over the substrate by exposing the composition to ultraviolet radiation; and
    (c) removing all coating layers from the substrate by exposing the coating to one or more chemical stripping agents.

2. The method according to claim 1 wherein the curable, removable multi-stage emulsion polymer comprises, as polymerized monomer units (a) zero to 60 percent, based on weight of the polymer, of a mono-ethylenically unsaturated monomer containing a carboxylic acid functional group; (b) 1 to 80 percent, based on weight of the polymer, of a (meth) acrylic monomer containing functional groups selected from one or more monoethylenically unsaturated monoepoxides, glycidyl (meth)acrylate, allyl glycidyl ether, glycidyl cinnamates, glycidyl crotonates, glycidyl itaconates, glycidyl norbornenyl ester, glycidyl norbornenyl ether and other acrylate containing pendant vinyl groups; (c) 20 to 80 percent, based on weight of the polymer, of one or more ($C_1$-$C_{20}$)alkyl (meth)acrylate ester monomers; and (e) zero to 10 percent, based on weight of the polymer, of one or more other co-polymerizable monomers.

3. A method for preparing a UV curable and removable multi-layer coating comprising
    (a) applying one or more layers of a base coat to a substrate wherein the base coat comprises a polymer product having a gel fraction of 0.3 to 0.95 in a solvent selected from one or more of acetone and tetrahydrofuran,
        wherein said polymer product is a dispersion of water-insoluble multi-stage latex polymer particles,
        and wherein the base coat is applied in one or more separate applications, allowing the base to dry after each application; and
    (b) applying one or more layers of a coating comprising a curable, removable multi-stage emulsion polymer.

4. The method according to claim 3 wherein the substrate refers to any surface that is vertical, horizontal or inclined upon which the coating is applied and is selected from the group consisting of flooring, wall, ceiling, tile materials, vinyl floor tiles, tiles coated with sealer or primer, ceramic tiles, wood, metal, concrete, marble, slate and simulated natural stone.

5. The method according to claim 3 wherein the curable, removable multi-stage emulsion polymer comprises, as polymerized monomer units (a) zero to 60 percent, based on weight of the polymer, of a mono-ethylenically unsaturated monomer containing a carboxylic acid functional group; (b) 1 to 80 percent, based on weight of the polymer, of a (meth) acrylic monomer containing functional groups selected from one or more monoethylenically unsaturated monoepoxides, glycidyl (meth)acrylate, allyl glycidyl ether, glycidyl cinnamates, glycidyl crotonates, glycidyl itaconates, glycidyl norbornenyl ester, glycidyl norbornenyl ether and other acrylate containing pendant vinyl groups; (c) 20 to 80 percent, based on weight of the polymer, of one or more ($C_1$-$C_{20}$)alkyl (meth)acrylate ester monomers; and (e) zero to 10 percent, based on weight of the polymer, of one or more other co-polymerizable monomers.

6. The method according to claim 4 wherein the substrate refers to any surface that is vertical, horizontal or inclined upon which the coating is applied and is selected from the group consisting of flooring, wall, ceiling, tile materials, vinyl floor tiles, tiles coated with sealer or primer, ceramic tiles, wood, metal, concrete, marble, slate and simulated natural stone.

7. The method according to claim 3
    wherein said said water-insoluble multi-stage latex polymer in said polymer product in said base coat comprises a shell that comprises a carboxylic acid-containing emulsion polymer that comprises, as polymerized units, one or more comonomers having carboxylic acid functionality, and
    wherein said water-insoluble multi-stage latex polymer in said polymer product in said base coat further comprises 5 to 80 percent, based on equivalents of acid groups, polyvalent metal ion.

8. The method according to claim 7, wherein said coating that is applied in said step (b) comprises a radiation-curable composition.

9. The method according to claim 8, wherein said curable, removable multi-stage emulsion polymer contained in said coating that is applied in said step (b) comprises, as polymerized units, one or more monoethylenically unsaturated monoepoxides.

10. The method according to claim 9, wherein said mono-ethylenically unsaturated monoepoxides comprises glycidyl methacrylate.

11. The method according to claim 7, wherein said comonomers having carboxylic acid functionality are selected from the group consisting of acrylic acid, methacrylic acid, itaconic acid, fumaric acid, citraconic acid, and mixtures thereof.

12. The method according to claim 7, wherein said comonomers having carboxylic acid functionality are selected from the group consisting of acrylic acid, methacrylic acid, and mixtures thereof.

13. The method according to claim 7, wherein said polyvalent metal ion is one or more polyvalent metal ion selected from the group consisting of zinc, calcium, magnesium, and zirconim.

14. The method according to claim 7, additionally comprising the steps of
    (c) curing said layers applied in said steps (a) and (b), and
    (d) subsequently removing all coating layers from said substrate by exposing the coating to one or more chemical stripping agents.

15. The method of claim 14, wherein said chemical stripping agents comprise ammonia or an amine.

16. The method according to claim 3, wherein said coating that is applied in said step (b) comprises a radiation-curable composition.

17. The method according to claim 3, wherein said curable, removable multi-stage emulsion polymer contained in said coating that is applied in said step (b) comprises, as polymerized units, one or more monoethylenically unsaturated monoepoxides.

18. The method according to claim 3, additionally comprising the steps of (c) curing said layers applied in said steps (a) and (b), and
(d) subsequently removing all coating layers from said substrate by exposing the coating to one or more chemical stripping agents.

19. The method of claim 18, wherein said chemical stripping agents comprise ammonia or an amine.

* * * * *